United States Patent
Cummings

(10) Patent No.: US 12,116,192 B1
(45) Date of Patent: *Oct. 15, 2024

(54) CORRUGATED PIZZA BOX AND METHOD FOR PRODUCTION OF SAME

(71) Applicant: Semi Corr Containers, Inc., Phillips, WI (US)

(72) Inventor: James Alan Cummings, Phillips, WI (US)

(73) Assignee: Semi Corr Containers, Inc., Phillips, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/581,155

(22) Filed: Feb. 19, 2024

Related U.S. Application Data

(63) Continuation-in-part of application No. 18/243,403, filed on Sep. 7, 2023, now Pat. No. 11,938,705, which is a continuation-in-part of application No. 18/123,675, filed on Mar. 20, 2023, now Pat. No. 11,794,439.

(51) Int. Cl.

| | |
|---|---|
| *B65D 65/40* | (2006.01) |
| *B31F 1/28* | (2006.01) |
| *B65D 5/42* | (2006.01) |
| *B65D 85/36* | (2006.01) |

(52) U.S. Cl.
CPC ............ *B65D 65/40* (2013.01); *B31F 1/2804* (2013.01); *B31F 1/2813* (2013.01); *B31F 1/285* (2013.01); *B65D 5/4295* (2013.01); *B65D 85/36* (2013.01); *B31F 1/2818* (2013.01); *B65D 2585/366* (2013.01)

(58) Field of Classification Search
CPC ............ B32B 2250/05; B32B 2250/26; B32B 29/005; B32B 29/08; B32B 7/12
See application file for complete search history.

(56) References Cited

U.S. PATENT DOCUMENTS

| | | | | |
|---|---|---|---|---|
| 4,441,626 A | * | 4/1984 | Hall ...................... | B31F 1/2813 |
| | | | | 426/118 |
| 5,146,823 A | * | 9/1992 | Holmes .................... | B26D 7/01 |
| | | | | 83/485 |
| 11,794,439 B1 | * | 10/2023 | Cummings ............. | B32B 29/08 |

* cited by examiner

*Primary Examiner* — Lawrence D Ferguson
(74) *Attorney, Agent, or Firm* — Wong Meyer Smith & McConnell

(57) ABSTRACT

A corrugated pizza box is made using a web fed rotary die cutter with the web produced by a corrugator singlefacer that is speed synchronized with the rotary die cutter. The singlefacer produces SemiCorr Singleface Board (SSB) made possible by special corrugating rolls that allow a bottom liner to be bonded to a fluted and creased medium or liner within the singlefacer. This medium or liner has cross flute bond lines that provide in-line stiffness to the two-ply board exiting the singlefacer.

7 Claims, 3 Drawing Sheets

CORRUGATED PIZZA BOX AND METHOD FOR PRODUCTION OF SAME

CROSS-REFERENCE TO RELATED APPLICATIONS

This application is a continuation-in-part of U.S. patent application Ser. No. 18/243,403, filed Sep. 7, 2023, which is a continuation-in-part of U.S. patent application Ser. No. 18/123,675, filed Mar. 20, 2023, now issued as U.S. Pat. No. 11,794,439, each of which is incorporated by reference herein in their entireties.

FIELD OF THE INVENTION

The present invention pertains to a corrugated pizza box product and a method for its manufacture. More specifically, the corrugated pizza box product is made using a two-ply panel that will significantly reduce the fiber content of the pizza box.

BACKGROUND OF THE INVENTION

Corrugated pizza boxes are a large component of total corrugated products produced in the United States. There are over 3 billion pizzas sold on average each year. These pizzas are mostly packaged in E flute singlewall corrugated board made from a top and bottom liner and a fluted medium.

Pizza boxes are typically made from sheets that are run on a corrugator. The sheets are then conveyed in stacks to a rotary die cutter line where they are fed by automatic sheet feeding equipment into the rotary die cutter hopper. The hopper then feeds individual sheets into the rotary die cutter where they are printed, die cut, and stacked as finished pizza box blanks.

Damage to sheets and waste can occur during the sheet handling process. Potential for jam-up exists in the die cutter hopper especially with warped board. The corrugator, conveyors, sheet feeder, die cutter, and die cut stacker are much more expensive than the pizza box line envisioned by the present invention. Further, there is a significant problem associated with the use of conventional singlewall corrugated boxes related to the condensation of steam in the box that can make the pizza soggy and unappealing. With the huge production of pizza boxes, a reduction in the cost of the box can net significant savings.

Consequently, there is a need for pizza box design that is simultaneously less expensive with a better performance and a method for production of the box that is more efficient and requires less capital investment.

SUMMARY OF THE INVENTION

Making pizza boxes using a two-ply panel versus the three-ply E flute singlewall board results in fiber reduction of over 30% providing huge savings for corrugated producers. The savings of 30% of the fiber in a pizza box is significant. Eliminating a 20#/MSF liner from a pizza box would save over $8/MSF at current prices. (MSF=1,000 square feet)

U.S. Pat. No. 11,794,439 B1, "Semi-Corrugated Paperboard Panels and Method for Production of Same," issued Oct. 24, 2023, also to the present inventor, discloses manufacture of a two-ply paperboard product, called "SemiCorr," which can be used in the production of pizza boxes.

SemiCorr is comprised of a fluted and creased medium that forms a creased base layer than can be run out of a singlefacer and up onto the bridge of a corrugator without bonding to a top liner. The creased base layer has cross flute bond lines formed by crease tools embedded in the SemiCorr corrugating rolls. These cross flute bond lines are normally facing in a downward direction so that they can be bonded to a bottom liner in the doublebacker of the corrugator. However, a version of SemiCorr uses an inverted creased base layer with cross flute bond lines facing in an upward direction. In this case, the creased base layer can be bonded directly to a bottom liner that is run in place of a top liner in the singlefacer to create a product called SemiCorr Singleface Board (SSB). SSB is structurally stiff in the in-line direction as well as cross machine direction right out of the singlefacer.

However, this version of SemiCorr could not be run up onto the bridge of the corrugator to be accumulated and conveyed to downstream equipment as the product would not be amenable to forming a bridge buffer.

The corrugated pizza box of the present invention is made using a web fed rotary die cutter with the web produced by a corrugator singlefacer that is speed synchronized with the rotary die cutter. The singlefacer produces SSB made possible by special corrugating rolls that allow a bottom liner to be bonded to a fluted and creased medium or liner within the singlefacer. This medium or liner has cross flute bond lines that provide in-line stiffness to the two-ply board exiting the singlefacer.

The two-ply pizza box manufactured using the web fed rotary die cutter replaces the three-ply pizza box thereby reducing the cost of the box. The manufacturing process itself is very efficient and significantly reduces the capital investment required to manufacture a pizza box.

In one embodiment of the present invention, the SSB from the singlefacer enters a hot plate system that further cures the board. The hot plate system has a pull section that securely holds the web. The web exits the hot plate system and is run directly into a rotary die cutter where it is formed into useful two-ply pizza boxes. With SSB, the orientation of the flutes inside the pizza box can be in either direction because the creases and flutes of the SSB create a pizza box panel that has equal in-line and cross machine flexural stiffness. As a consequence, the die cuts can be formed with either the long dimension or the shorter width dimension of the pizza box exiting the die cutter. This choice is made by fitting the dimensions of the pizza box to the specific rotary die cut drum diameter. The continuous SSB of width or length equal to two or more pizza box panels is run into the print and rotary die cylinders that have circumference equal to an integral multiple of one of these dimensions to create multiple up and multiple out pizza box panels. For example, a pizza box of dimension 16 inches by 33 inches could be run as a two up and six out on a 66 inch die cutter.

In one particularly advantageous embodiment of the invention, the equipment described herein can run trim rolls. Trim rolls are the butt ends of rolls slit on a paper machine that are narrow to the point that they are not appropriate to run on a conventional corrugator because of the reduced productivity. These trim rolls are commonly sold at discounts of up to 50% so that the paper mill can sell them on the open market. Making pizza boxes from two-ply SemiCorr board using trim rolls will significantly reduce the cost of the box.

A pizza box made from a conventional three ply singlewall board using 20 #/MSF liners and a 20#/MSF medium will have a combined board basis weight of 64 #/MSF and a fiber cost of $25/MSF at current prices of paper. A two ply SemiCorr pizza box of the present invention using a 20#/

MSF liner and a 20#/MSF medium will have a combined board basis weight of 44#/MSF and a fiber cost of $17/MSF. This same box made using trim rolls may have a fiber cost of $9/MSF. These differences in fiber cost will result in savings of 4 cents to 8 cents per pizza box. A pizza box line of the current invention running two up and six out at modest production speed of 550 FPM can make 72,000 pizza boxes per hour or over 140,000,000 per year. The fiber savings with SemiCorr pizza boxes of the present invention compared to conventional pizza boxes would be $5.6 million per year and even more running trim rolls. The SemiCorr pizza box line with splicers, roll stands, preheater, singlefacer, short hot plate section, rotary die cutter, and stacker would have a cost of $4 million with results being less than a one year payback. Further, this technology would mitigate the steam issue associated with the pizza box.

BRIEF DESCRIPTION OF THE DRAWINGS

The foregoing and other aspects of the present invention will become apparent to those skilled in the art to which the present invention relates upon reading the following description with reference to the drawings below.

DETAILED DESCRIPTION OF THE DRAWINGS

Figure 1:
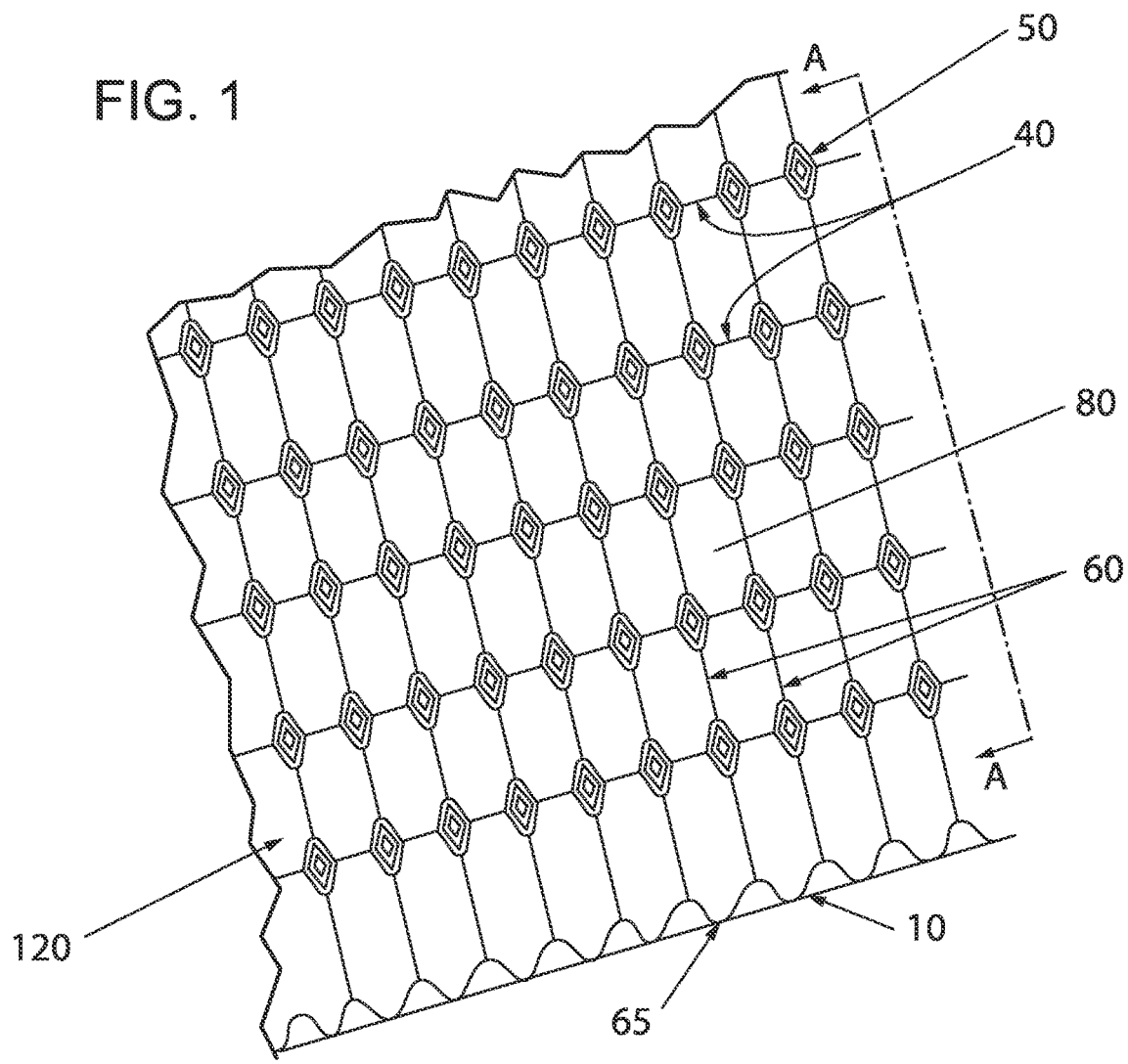
FIG. 1 is a perspective view of the inside of the two-ply SemiCorr Singleface Board.

FIG. 1 is the perspective view of the inside of a SemiCorr singleface board 120. The SemiCorr singleface board 120 is comprised of bottom liner 10 adhered to a creased base layer 80. The creased base layer 80 is defined by a conventional fluted medium ply or flutes 60 that has cross flute bond lines 40. The cross flute bond lines 40 are spaced at regular close intervals across the flutes 60 and are bonded along with the bottom tips of the flutes 65 to the inside of bottom liner 10 to form the SemiCorr singleface board 120. The cross flute bond lines 40 are crushed into the flutes 60 by a creasing process that is defined in U.S. Pat. No. 11,794,439 B1, "Semi-Corrugated Paperboard Panels and Method for Production of Same," hereby incorporated by reference.

Figure 2:
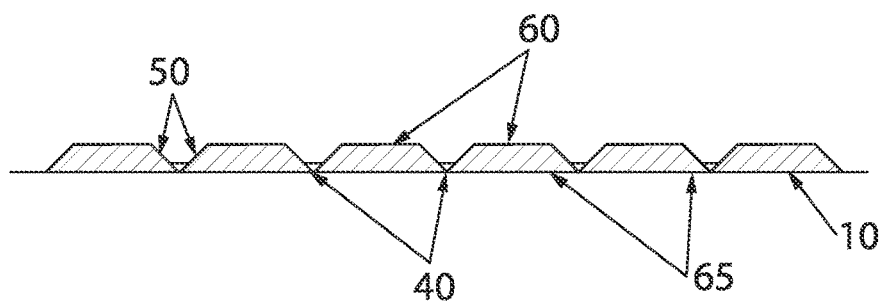
FIG. 2 is a section view of the SemiCorr Singleface Board.

The creases 50 are clearly shown in FIG. 2 which is section view A-A of the SemiCorr singleface board of FIG. 1. The cross flute bond lines 40 and the tips of the flutes 65 are bonded to the bottom liner 10 as starch adhesive applied in the glue machine of the singlefacer forms a green bond at the pressure roll.

Figure 3:
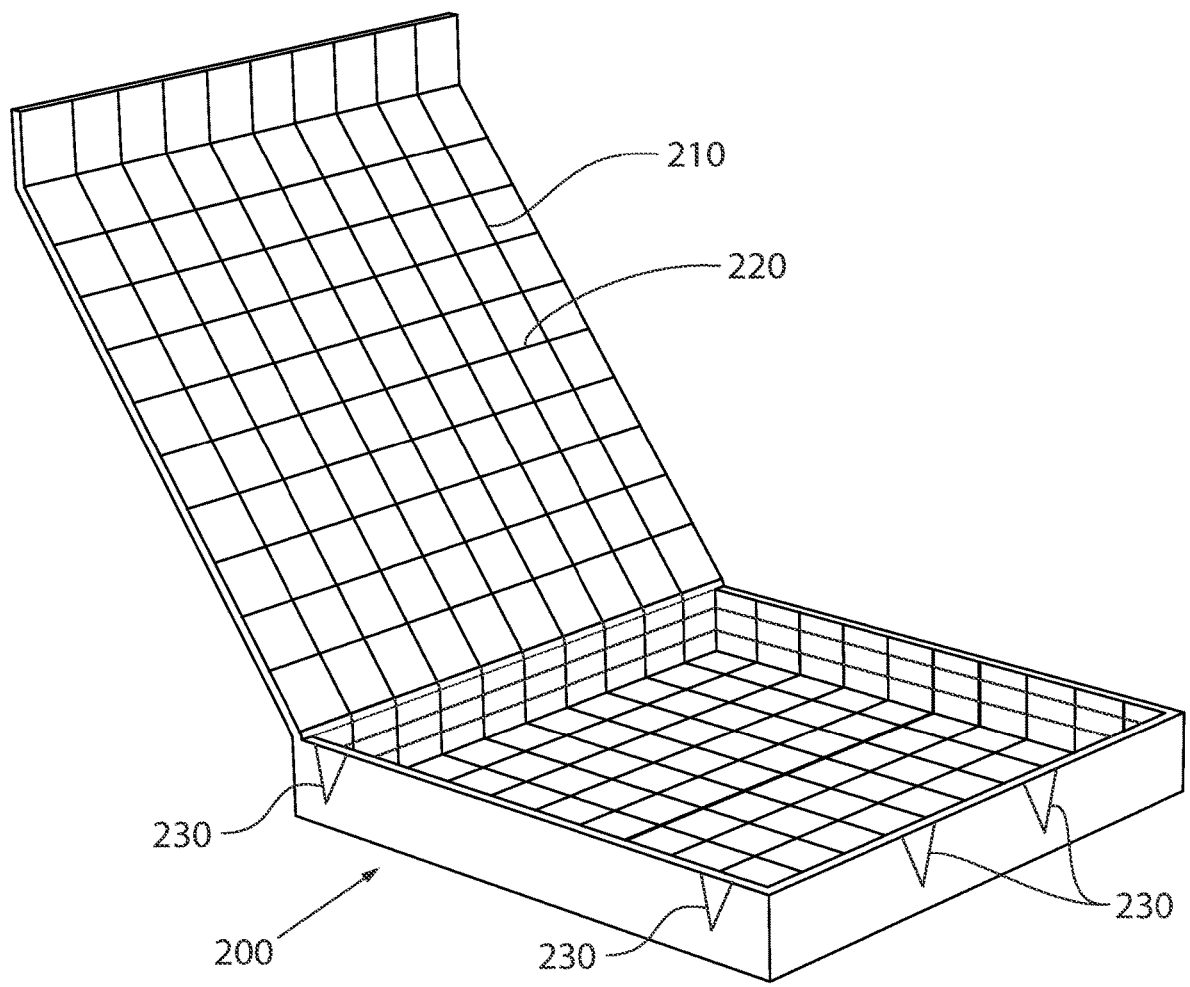
FIG. 3 is an oblique view of the inside of the SemiCorr two-ply pizza box.

FIG. 3 shows SemiCorr pizza box 200 with creases 210 and flutes 220 exposed on the inside of the box. The flutes and creases lead steam condensing inside the box toward vents 230.

The biggest challenge of pizza box designers is to create a package that retains heat without trapping steam from the hot pizza. The pizza box made from the SSB will have the liner on the outside of the box, but the inside of the box will be comprised of the creased side of the creased base layer which will have the exposed flutes in one direction of the box as well as the crease channels in the other direction of the box. The pressure of steam emanating from the hot pizza will force the steam to flow along the exposed flutes and crease channels towards the edge of the box where vents are positioned as opposed to condensing on the roof of the box and dripping onto the pizza making it soggy.

Careful selection of the medium used for the pizza box will avoid excessive absorption of moisture by the paper itself. A liner or a coated medium can be used to avoid the absorption problem. Following the precepts of the present invention, the pizza box made using the SSB web fed rotary die cutter concept will reduce fiber content of the box thereby significantly lowering its cost while simultaneously improving the box performance.

Figure 4:
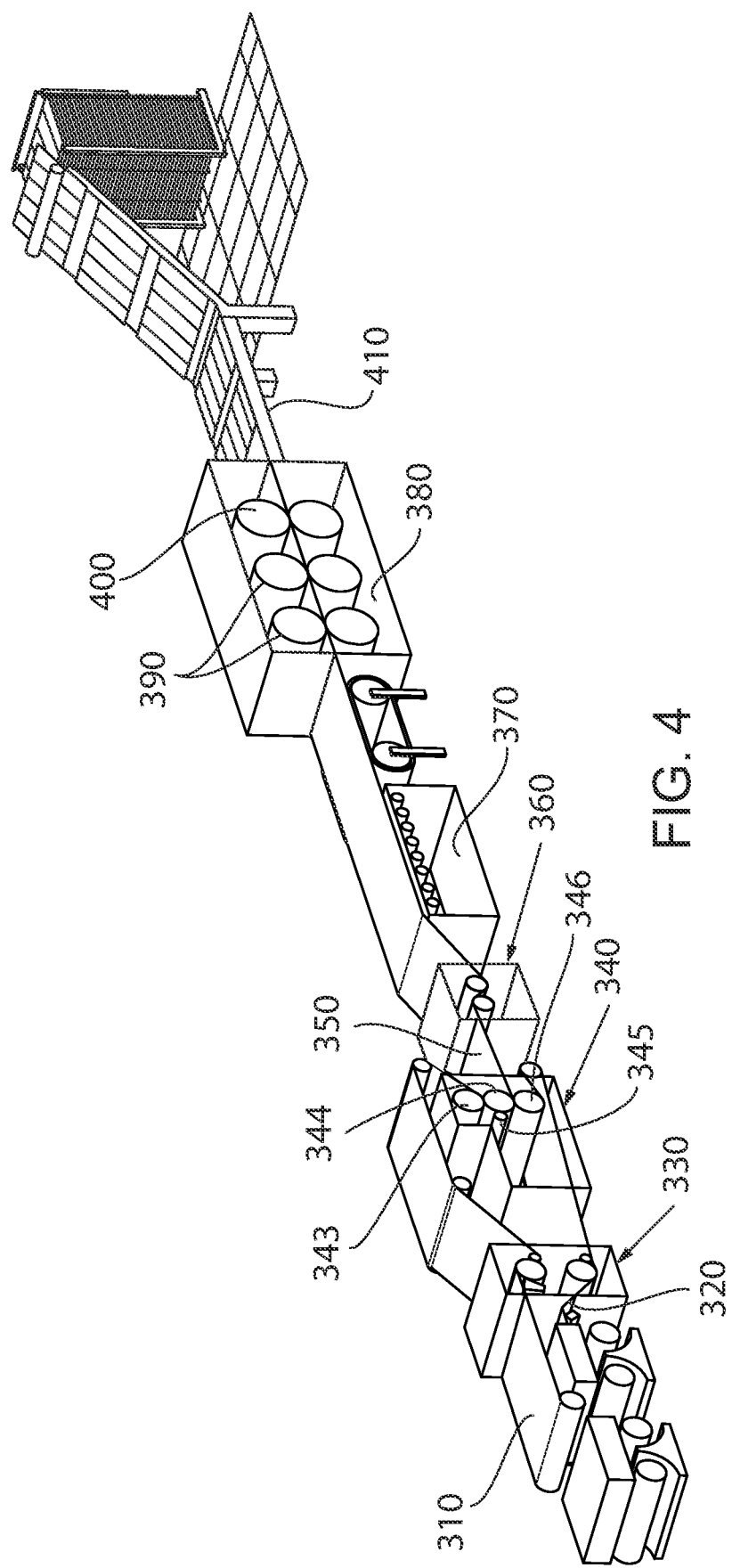
FIG. 4 is a side view layout drawing of the pizza box line.

FIG. 4 shows liner 310 and medium (or liner) 320 exiting their respective splicers, entering preheater 330 and then singlefacer 340. The medium is conditioned and then run between upper corrugated roll 343 and lower corrugated roll 344. The fluted and creased medium exits the labyrinth between the corrugating rolls and has starch applied to the flute tips and cross flute bond lines at glue roll 345. The liner is then bonded to the flute tips and cross flute bond lines of the medium with pressure roll 346. The two-ply web 350 then exits the singlefacer 340 and enters a speed synchronization system 360 from which it enters the hot plate system 370 and then rotary die cutter 380.

The rotary die cutter and singlefacer must be speed synchronized. One of these machines is the "master" from a speed point of view. According to the precepts of the present invention, the means of synching the speeds of these machines involves using a table with rollers 360 that can raise or lower taking up the web or feeding it from one machine to the other as speed mismatches develop. A laser sensor (not shown) measuring the height of the roller table is used to provide feedback to the rotary die cutter or singlefacer drive systems to adjust speeds to keep the machines synchronized.

The web 350 is then printed synchronously by print cylinders 390 and die cut with synchronized die cylinders 400. The die cut multiple outs and multiple up sheets are then stacked in rotary die cut stacker 410. There are different sizes of pizza boxes which make it necessary to match the die cutter cylinder diameter and pizza box in-line dimensions. There are several standard dimension rotary die cutters with cylinders that would match well with either the length or width of conventional pizza box sizes. The use of die cut attachments may facilitate solution to this issue as well. A way to adapt the print to the pizza box is to use preprint for the bottom liner and register die cut to print. This choice, however, may reduce the fiber savings as preprinted liner is more expensive. Yet another way to match print to the pizza box size and market requirement for different art work is the use of digital printing. The pizza box business is huge with very long runs the norm. For companies with multiple plants within a given geographic area, it may be possible to have plants consolidate their orders so that a given line could be dedicated to the production of a few pizza box sizes that match the parameters of the line.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

I claim:

1. A pizza box fabricated from a two-ply panel with the two-ply panel made from a corrugated product comprised of:
    a bottom liner; and
    an inverted creased base layer of medium or liner that has a first flute type having opposed tips directed in a downward direction and upward direction, respectively, to define a fluted web and multiple cross flute bond lines creased to produce orthogonal edges at intervals across the fluted web with the multiple cross flute bond lines facing in an upward direction;
    wherein the bottom liner is bonded directly to the fluted web and the multiple cross flute bond lines of the creased base layer of medium or liner to provide exposed flute tips and orthogonal creases on an inside of the pizza box and the bottom liner defining an outer surface of the pizza box.

2. A method for making the pizza box of claim 1 comprising
    using a production line, fabricating a two-ply web comprising
    a bottom liner; and
    an inverted creased base layer of medium or liner that has a first flute type having opposed tips directed in a downward direction and upward direction, respectively, to define a fluted web and multiple cross flute bond lines creased to produce orthogonal edges at intervals across the fluted web with the multiple cross flute bond lines facing in an upward direction;
    wherein the bottom liner is bonded directly to the fluted web and the multiple cross flute bond lines of the creased base layer of medium or liner to provide exposed flute tips and orthogonal creases on an inside of the pizza box and the bottom liner defining an outer surface of the pizza box;
    wherein the two-ply web exits a singlefacer;
    introducing the two-ply web to a rotary die cutter that has a die cut cylinder of circumference equal to a multiple integral of the pizza box in-line length or width with the rotary die cutter;
    creating pizza box blanks as an output as the two-ply web proceeds through the production line.

3. The method of claim 2 further comprising
    using one to four print stations located within the rotary die cutter with cylinders of the print stations of circumference equal to a multiple integral of the pizza box in-line length or width, printing on the pizza box blanks.

4. The method of claim 2 further comprising
    using one or more digital print stations located within the rotary die cutter, printing ink on the pizza box blanks.

5. The method of claim 2 further comprising
    using a hot plate curing station comprised of a hot plate system, a hold down, and a pulling section located between the singlefacer and the die cutter, curing the two-ply web as it exits the singlefacer.

6. The method of claim 2 further comprising
    using a station, taking up the two-ply panel as speed mismatches develop between the singlefacer and the rotary die cutter; and
    using a control system, creating synchronized speeds between the singlefacer and the rotary die cutter.

7. The method of claim 2 further comprising
    Using a stacker forming multiple out loads of pizza boxes.

* * * * *